US009710762B2

(12) United States Patent
Nakil et al.

(10) Patent No.: US 9,710,762 B2
(45) Date of Patent: Jul. 18, 2017

(54) DYNAMIC LOGGING (71) Applicant: Juniper Networks, Inc., Sunnyvale, CA (US)

(72) Inventors: Harshad Bhaskar Nakil, San Jose, CA (US); Ankur Singla, Belmont, CA (US); Rajashekar Reddy, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 397 days.

(21) Appl. No.: 13/841,736

(22) Filed: Mar. 15, 2013

(65) Prior Publication Data

US 2013/0332601 A1 Dec. 12, 2013

Related U.S. Application Data (60) Provisional application No. 61/729,474, filed on Nov. 23, 2012, provisional application No. 61/723,684, (Continued)

(51) Int. Cl.
| | |
|---|---|
| *G06F 15/173* | (2006.01) |
| *G06N 99/00* | (2010.01) |
| *H04L 12/26* | (2006.01) |
| *H04L 12/24* | (2006.01) |
| *H04L 29/14* | (2006.01) |
| *G06F 11/00* | (2006.01) |
| *H04L 12/761* | (2013.01) |
| *H04L 29/12* | (2006.01) |

(52) U.S. Cl.
CPC ......... *G06N 99/005* (2013.01); *G06F 11/008* (2013.01); *H04L 41/0631* (2013.01); *H04L 41/147* (2013.01); *H04L 43/04* (2013.01); *H04L 43/0852* (2013.01); *H04L 43/10* (2013.01); *H04L 45/16* (2013.01); *H04L 69/40* (2013.01); *H04L 61/103* (2013.01)

(58) Field of Classification Search
CPC ................. G06N 99/005; G06F 11/008; G06F 2009/45591; H04L 41/0631; H04L 41/147; H04L 43/04; H04L 43/0852; H04L 43/10; H04L 69/40; H04L 41/06; H04L 41/069
USPC .......................... 709/217, 218, 219, 223, 224
See application file for complete search history.

(56) References Cited

U.S. PATENT DOCUMENTS

7,120,685 B2 * 10/2006 Ullmann et al. ............... 709/224
7,818,274 B1 * 10/2010 Ottamalika ...................... 706/45
(Continued)

*Primary Examiner* — Liangche A Wang
*Assistant Examiner* — Kaylee Huang
(74) *Attorney, Agent, or Firm* — Shumaker & Sieffert, P.A.

(57) ABSTRACT

In general, techniques are described for dynamically modifying the extent of logging performed by logging information generators in response to events detected in logging information received by the collector. In some examples, a network device includes one or more processors and a collector executed by the processors to receive a log message that includes logging information from a generator. The network device also includes a rules engine to apply one or more rules that each specify a condition and a corresponding action to the logging information to identify a matching rule, wherein the rules engine, upon identifying a matching rule, executes the action of the matching rule to generate and send a logging modification message to increase an extent to which the generator generates logging information.

18 Claims, 7 Drawing Sheets

Related U.S. Application Data filed on Nov. 7, 2012, provisional application No. 61/723,685, filed on Nov. 7, 2012, provisional application No. 61/722,696, filed on Nov. 5, 2012, provisional application No. 61/721,979, filed on Nov. 2, 2012, provisional application No. 61/721,994, filed on Nov. 2, 2012, provisional application No. 61/718,633, filed on Oct. 25, 2012, provisional application No. 61/656,468, filed on Jun. 6, 2012, provisional application No. 61/656,469, filed on Jun. 6, 2012, provisional application No. 61/656,471, filed on Jun. 6, 2012.

(56) References Cited

U.S. PATENT DOCUMENTS

| | | | |
|---|---|---|---|
| 8,825,840 B2 * | 9/2014 | Chung | G06F 21/552 709/224 |
| 2007/0143795 A1 * | 6/2007 | Tran | G06F 11/3636 725/46 |
| 2013/0070762 A1 * | 3/2013 | Adams | H04L 49/70 370/389 |
| 2013/0097304 A1 * | 4/2013 | Asthana | H04L 41/5025 709/224 |
| 2013/0227352 A1 * | 8/2013 | Kumarasamy et al. | 714/47.1 |

* cited by examiner

FIG. 7

DYNAMIC LOGGING

PRIORITY CLAIM

This application claims the benefit of U.S. Provisional Application No. 61/729,474, filed Nov. 23, 2012; U.S. Provisional Application No. 61/723,684, filed Nov. 7, 2012; U.S. Provisional Application No. 61/723,685, filed Nov. 7, 2012; U.S. Provisional Application No. 61/722,696, filed Nov. 5, 2012; U.S. Provisional Application No. 61/721,979, filed Nov. 2, 2012; U.S. Provisional Application No. 61/721,994, filed Nov. 2, 2012; U.S. Provisional Application No. 61/718,633, filed Oct. 25, 2012; U.S. Provisional Application No. 61/656,468, filed Jun. 6, 2012; U.S. Provisional Application No. 61/656,469, filed Jun. 6, 2012; and U.S. Provisional Application No. 61/656,471, filed Jun. 6, 2012; the entire content of each of which being incorporated herein by reference.

TECHNICAL FIELD

The invention relates to computer networks and more particularly to logging information for virtual networks.

BACKGROUND

In a typical cloud data center environment, there is a large collection of interconnected servers that provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

For troubleshooting purposes, a data center may include a logging device, or "collector," that communicates with devices within the data center to obtain information from the devices that describes the devices' operation, such as errors, events, operations performed, etc. Devices that generate logging information may alternatively be referred to herein as "generators." Such information is commonly referred to as log information and the collector may record the log information to a database or a collection of log files that is a central repository of logging information for devices in the system. To the extent possible, system administrators often prefer to diagnose conditions in the distributed systems using logging information rather than reproducing the problems, which is generally undesirable. In distributed systems, such as the aforementioned data center, a large number of devices may generate logging information.

The generation, storage, and use of logging information require balancing a number of tradeoffs however. For example, while generating as much logging information as possible is often desirable for troubleshooting, logging copious amounts of information can produce large log files and also takes up bandwidth and computational resources, which may slow the application and other applications concurrently executing on the device. Conversely, logging too little information risks rendering the logging information of little value in troubleshooting.

SUMMARY

In general, techniques are described for dynamically modifying the extent of logging performed by logging information generators in response to events detected in logging information received by the collector. For example, a generator device may log information to an extent that accords with a logging baseline and regularly update the collector with the baseline logging information. The collector may determine, by analyzing the baseline logging information, that an event has occurred on or been detected by the generator that indicates a need for a greater logging extent. In other words, the collector may determine that the generator is to log more information than what is stipulated by the logging baseline due, e.g., to an error event. The collector may therefore direct the generator to increase its logging extent to log additional information. In some instances, this directive may include requesting the generator to reply with additional state information. In some instances, this directive may include requesting the generator to actively probe the application by, e.g., triggering a diagnostic subroutine that generates additional logging information than what is stipulated by the baseline. The techniques may, as a result, enable a collector to dynamically adapt the extent of logging performed by a logging information generator to expand the amount of logging information collected when needed. In a data center environment in which a large number of devices may generate logging information, the techniques may result in a more manageable collection of logging information.

In one aspect, a method includes receiving, by a collector, a log message that includes logging information from a generator. The method also includes applying, by the collector, one or more rules that each specify a condition and a corresponding action to the logging information to identify a matching rule. The method further includes, upon identifying a matching rule, executing the action of the matching rule to generate and send a logging modification message to increase an extent to which the generator generates logging information.

In another aspect, a network device includes one or more processors and a collector executed by the processors to receive a log message that includes logging information from a generator. The network device also includes a rules engine to apply one or more rules that each specify a condition and a corresponding action to the logging information to identify a matching rule, wherein the rules engine, upon identifying a matching rule, executes the action of the matching rule to generate and send a logging modification message to increase an extent to which the generator generates logging information.

In another aspect, a method includes sending, by a computing device and to a collector, baseline logging information for an application in a log message. The method also includes receiving, by the computing device and from the collector, a logging modification message. The method further includes, responsive to the logging modification message, increasing an extent to which the application generates logging information. The method also includes sending, by the computing device and to the collector, an additional log message that includes additional logging information generated by the application in accordance with the increased extent.

In another aspect, a network device includes one or more processors and an application executed by the processors. The network device also includes an output device to send, to a collector, baseline logging information for the application in a log message. The network device further includes an input device to receive, from the collector, a logging modification message, wherein the application, responsive to the logging modification message, increases an extent to which the application generates logging information, and wherein the output device sends, to the collector, an additional log message that includes additional logging information generated by the application in accordance with the increased extent.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
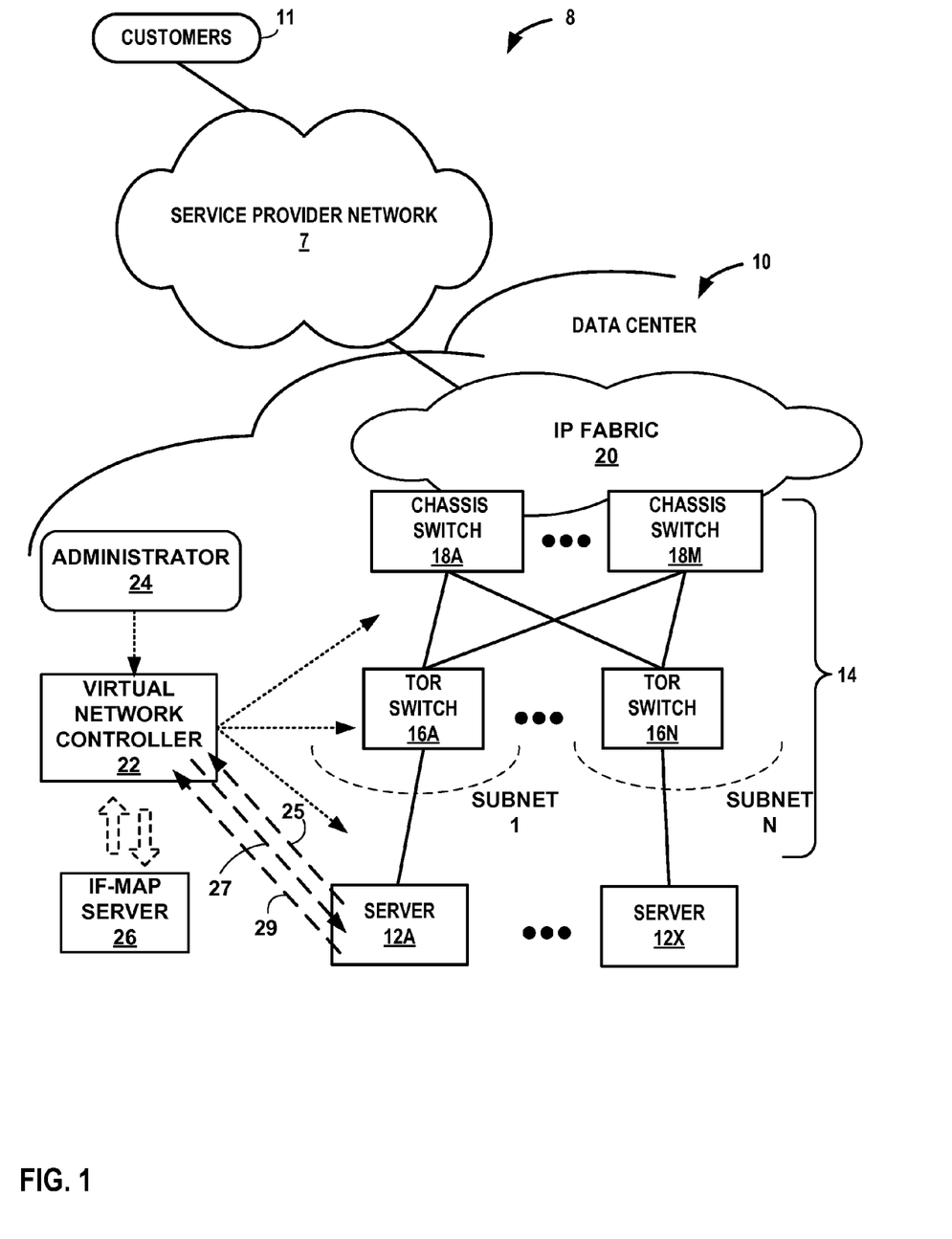
FIG. 1 is a block diagram illustrating an example network having a data center in which examples of the techniques described herein may be implemented.

FIG. 1 is a block diagram illustrating an example network 8 having a data center 10 in which examples of the techniques described herein may be implemented. In general, data center 10 provides an operating environment for applications and services for customers 11 coupled to the data center by service provider network 7. Data center 10 may, for example, host infrastructure equipment, such as networking and storage systems, redundant power supplies, and environmental controls. Service provider network 7 may be coupled to one or more networks administered by other providers, and may thus form part of a large-scale public network infrastructure, e.g., the Internet.

In some examples, data center 10 may represent one of many geographically distributed network data centers. As illustrated in the example of FIG. 1, data center 10 may be a facility that provides network services for customers 11. Customers 11 may be collective entities such as enterprises and governments or individuals. For example, a network data center may host web services for several enterprises and end users. Other exemplary services may include data storage, virtual private networks, traffic engineering, file service, data mining, scientific- or super-computing, and so on. In some embodiments, data center 10 may be individual network servers, network peers, or otherwise.

In this example, data center 10 includes set of storage systems and application servers 12A-12X (herein, "servers 12") interconnected via high-speed switch fabric 14 provided by one or more tiers of physical network switches and routers. Switch fabric 14 is provided by a set of interconnected top-of-rack (TOR) switches 16A-16N (collectively, "TOR switches 16") coupled to a distribution layer of chassis switches 18A-18M (collectively, "chassis switches 18"). Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 16 and chassis switches 18 provide servers 12 with redundant (multi-homed) connectivity to IP fabric 20 and service provider network 7. Chassis switches 18 aggregate traffic flows and provides high-speed connectivity between TOR switches 16. TOR switches 16 may be network devices that provide layer 2 (MAC) and/or layer 3 (e.g., IP) routing and/or switching functionality. TOR switches 16 and chassis switches 18 may each include one or more processors and a memory, and that are capable of executing one or more software processes. Chassis switches 18 are coupled to IP fabric 20, which performs layer 3 routing to route network traffic between data center 10 and customers 11 by service provider network 7.

Virtual network controller (VNC) 22 provides a logically and in some cases physically centralized controller for facilitating operation of one or more virtual networks within data center 10 in accordance with one or more embodiments of this disclosure. In some examples, VNC 22 may operate in response to configuration input received from network administrator 24. Virtual network controller 22 operates as a logging information collector to obtain logging information from different elements of data center 10, including any of chassis switches 18, TOR switches 16, IF-MAP server 26, and any of servers 12 or applications executing thereon. Chassis switches 18, TOR switches 16, IF-MAP server 26, and any of servers 12 may generally be referred to as "generators" herein. Although described below primarily with respect to server 12A, the techniques of this disclosure may therefore be applied to at least any of the aforementioned network elements.

Server 12A is configured to generate logging information in accordance with a baseline extent of logging. Server 12A and other generators of logging information are alternatively referred to herein as "generators." The baseline extent refers to the types and amount of logging information that is collected by generators under ordinary or "baseline" operating circumstances with the logging extent unmodified by VNC 22. Server 12A sends collected logging information to VNC 22 in log messages. Server 12A may send the log messages periodically or responsive to some event, e.g., the generation of new logging information or a certain amount of logging information generated, to update the logging information for server 12A on VNC 22. In the illustrated example, server 12A sends log message 25 including newly-generated logging information to VNC 22.

In accordance with techniques described herein, VNC 22 analyzes the logging information in log message 25 to determine that the extent of logging performed by server 12A should be modified. Virtual network controller 22 therefore generates and sends logging modification message 27 to server 12A to indicate to server 12A the new extent of logging. Server 12A modifies its logging operations to conform to the extent of logging specified by VNC 22, which may include increasing an amount of logging by, e.g., returning state information already stored to memory for an application, directing the application to execute one or more diagnostic subroutines to generate additional logging information, setting a variable or flag that causes the application to generate logging information to a greater extent over the baseline. Server 12A returns the logging information generated in accordance with the increase over the baseline extent in log message 29. In this way, VNC 22 dynamically adapts the extent of logging performed by server 12A to expand the amount of logging information collected when indicated by previously-received logging information (here, the logging information in log message 25).

In some examples, in addition to dynamically adjusting the extent of logging information generated by server 12A, VNC 22 may also direct server 12A to modify a rate of sending log messages. For instance, server 12A may generate log messages for baseline logging information periodically. When directed by VNC 22 according to described techniques, server 12A may increase the rate of log messages and/or may send logging information generated in accordance with the increase over the baseline extent as soon as possible after its generation to rapidly provide the logging information to VNC 22 to facilitate rapid response to the events of interest, e.g., errors and/or exceptions caused by the execution of one or more applications by server 12A.

Figure 2:
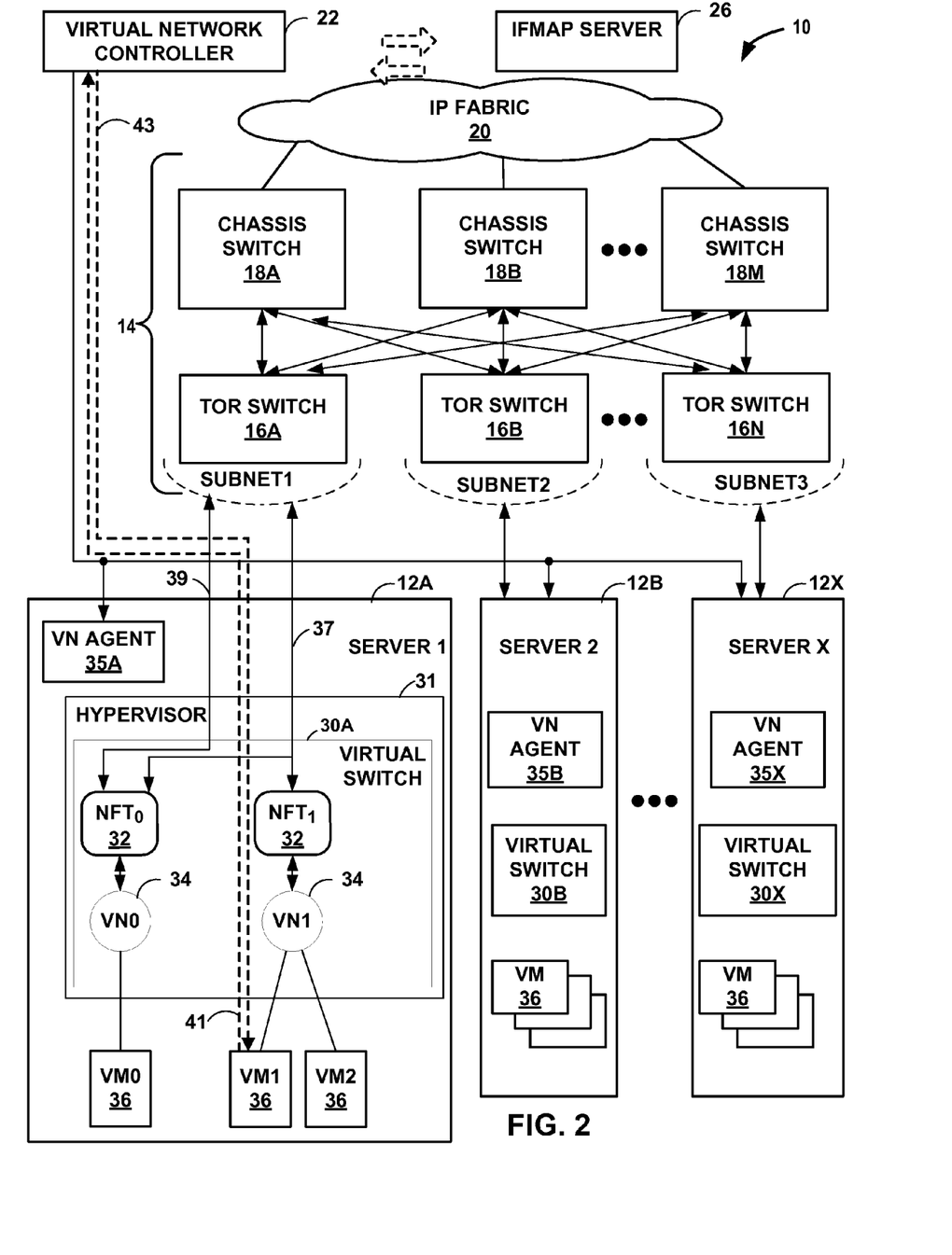
FIG. 2 is a block diagram illustrating an example implementation of the data center of FIG. 1 in further detail.

FIG. 2 is a block diagram illustrating an example implementation of data center 10 of FIG. 1 in further detail. In the example of FIG. 2, data center 10 includes an overlay network that extends switch fabric 14 from physical switches 16, 18 to software or "virtual" switches 30A-30X (collectively, "virtual switches 30"). Virtual switches 30 dynamically create and manage one or more virtual networks 34 usable for communication between application instances. In one example, virtual switches 30 execute the virtual network as an overlay network, which provides the capability to decouple an application's virtual address from a physical address (e.g., IP address) of the one of servers 12A-12X ("servers 12") on which the application is executing. Each virtual network may use its own addressing and security scheme and may be viewed as orthogonal from the physical network and its addressing scheme. Various techniques may be used to transport packets within and across virtual network(s) 34 over the physical network.

Each virtual switch 30 may execute within a hypervisor, a host operating system or other component of each of servers 12. In the example of FIG. 2, virtual switch 30A executes within hypervisor 31, also often referred to as a virtual machine manager (VMM), which provides a virtualization platform that allows multiple operating systems to concurrently run on one of host servers 12. In the example of FIG. 2, virtual switch 30A manages virtual networks 34, each of which provides a network environment for execution of one or more virtual machines (VMs) 36 on top of the virtualization platform provided by hypervisor 31. Each VM 36 is associated with one of the virtual subnets VN0-VN2 managed by the hypervisor 31.

In general, each VM 36 may be any type of software application and may be assigned a virtual address for use within a corresponding virtual network 34, where each of the virtual networks may be a different virtual subnet provided by virtual switch 30A. A VM 36 may be assigned its own virtual layer three (L3) IP address, for example, for sending and receiving communications but may be unaware of an IP address of the physical server 12A on which the virtual machine is executing. In this way, a "virtual address" is an address for an application that differs from the logical address for the underlying, physical computer system, e.g., server 12A in the example of FIG. 2.

In one implementation, each of servers 12 includes a corresponding one of virtual network (VN) agents 35A-35X (collectively, "VN agents 35") that controls the overlay of virtual networks 34 and that coordinates the routing of data packets within server 12. In general, each VN agent 35 communicates with virtual network controller 22, which generates commands to control routing of packets through data center 10. VN agents 35 may operate as a proxy for control plane messages between virtual machines 36 and virtual network controller 22. For example, a VM 36 may request to send a message using its virtual address via the VN agent 35A, and VN agent 35A may in turn send the message and request that a response to the message be received for the virtual address of the VM 36 that originated the first message. In some cases, a VM 36 may invoke a procedure or function call presented by an application programming interface of VN agent 35A, and the VN agent 35A may handle encapsulation of the message as well, including addressing.

In one example, network packets, e.g., layer three (L3) IP packets or layer two (L2) Ethernet packets generated or consumed by the instances of applications executed by virtual machines 36 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet." Encapsulation and/or de-capsulation of virtual network packets within physical network packets may be performed within virtual switches 30, e.g., within the hypervisor or the host operating system running on each of servers 12. As another example, encapsulation and de-capsulation functions may be performed at the edge of switch fabric 14 at a first-hop TOR switch 16 that is one hop removed from the application instance that originated the packet. This functionality is referred to herein as tunneling and may be used within data center 10 to create one or more overlay networks. Besides IPinIP, other example tunneling protocols that may be used include IP over GRE, VxLAN, MPLS over GRE, etc.

As noted above, virtual network controller 22 provides a logically centralized controller for facilitating operation of one or more virtual networks within data center 10. Virtual network controller 22 may, for example, maintain a routing information base, e.g., one or more routing tables that store routing information for the physical network as well as one or more overlay networks of data center 10. Similarly, switches 16, 18 and virtual switches 30 maintain routing information, such as one or more routing and/or forwarding tables. In one example implementation, virtual switch 30A of hypervisor 31 implements a network forwarding table (NFT) 32 for each virtual network 34. In general, each NFT 32 stores forwarding information for the corresponding virtual network 34 and identifies where data packets are to be forwarded and whether the packets are to be encapsulated in a tunneling protocol, such as with a tunnel header that may include one or more headers for different layers of the virtual network protocol stack.

The routing information may, for example, map packet key information (e.g., destination IP information and other select information from packet headers) to one or more specific next hops within the networks provided by virtual switches 30 and switch fabric 14. In some case, the next hops may be chained next hop that specify a set of operations to be performed on each packet when forwarding the packet, such as may be used for flooding next hops and multicast replication. In some cases, virtual network controller 22 maintains the routing information in the form of a radix tree having leaf nodes that represent destinations within the network. U.S. Pat. No. 7,184,437 provides details on an exemplary embodiment of a router that utilizes a radix tree for route resolution, the contents of U.S. Pat. No. 7,184,437 being incorporated herein by reference in its entirety.

As shown in FIG. 2, each virtual network 34 provides a communication framework for encapsulated packet communications 37 for the overlay network established through switch fabric 14. In this way, network packets associated with any of virtual machines 36 may be transported as encapsulated packet communications 37 via the overlay network. In addition, in the example of FIG. 2, each virtual switch 30 includes a default network forwarding table $NFT_0$ and provides a default route that allows a packet to be forwarded to virtual subnet VN0 without encapsulation, i.e., non-encapsulated packet communications 39 per the routing rules of the physical network of data center 10. In this way, subnet VN0 and virtual default network forwarding table $NFT_0$ provide a mechanism for bypassing the overlay network and sending non-encapsulated packet communications 39 to switch fabric 14.

Moreover, virtual network controller 22 and virtual switches 30 may communicate using virtual subnet VN0 in accordance with default network forwarding table $NFT_0$ during discovery and initialization of the overlay network, and during conditions where a failed link has temporarily halted communication via the overlay network. Once connectivity with the virtual network controller 22 is established, the virtual network controller 22 updates its local routing table to take into account new information about any failed links and directs virtual switches 30 to update their local network forwarding tables 32. For example, virtual network controller 22 may output commands to virtual network agents 35 to update one or more NFTs 32 to direct virtual switches 30 to change the tunneling encapsulation so as to re-route communications within the overlay network, for example to avoid a failed link.

When link failure is detected, a virtual network agent 35 local to the failed link (e.g., VN Agent 35A) may immediately change the encapsulation of network packet to redirect traffic within the overlay network and notifies virtual network controller 22 of the routing change. In turn, virtual network controller 22 updates its routing information any may issues messages to other virtual network agents 35 to update local routing information stored by the virtual network agents within network forwarding tables 32.

VM1 36 or an application executing thereon is configured to generate logging information in accordance with a baseline extent of logging. VM1 36 sends collected logging information to VNC 22 in log messages. In the illustrated example, VM1 36 sends log message 41 including newly-generated logging information to VNC 22. VM1 36 may be configured to send log message 41 using the default network forwarding table $NFT_0$ that provides a default route that allows a packet to be forwarded to VNC 22 by virtual subnet VN0 without encapsulation, i.e., non-encapsulated packet communications 39 per the routing rules of the physical network of data center 10. In some examples, VM1 36 may be configured with a virtual network address that virtual switch 30A maps to a physical network address of VNC 22 for non-encapsulated transmission of log message 41 to VNC 22.

In still further examples, VM1 36 sends log message 41 by VN agent 35A operating as a proxy for control plane messages between virtual machines 36 and virtual network controller 22. For example, VM1 36 request to send log message 41 using its virtual address via the VN agent 35A, and VN agent 35A may in turn send log message 41 and request that a response to the message be received for the virtual address of the VM 36 that originated log message 41. In some cases, a VM 36 may invoke a procedure or function call presented by an application programming interface of VN agent 35A, and the VN agent 35A may handle encapsulation of the message as well, including addressing.

VNC 22 analyzes the logging information in log message 25 to determine that the extent of logging performed by VM1 36 should be modified. Virtual network controller 22 therefore generates and sends logging modification message 43 to server VM1 36 to indicate to VM1 36 the new extent of logging. VM1 36 modifies its logging operations to conform to the extent of logging specified by VNC 22, which may include increasing an amount of logging by, e.g., returning state information already stored to memory for an application or by directing the application to execute one or more diagnostic subroutines to generate additional logging information. VM1 36 may return the logging information generated in accordance with the increase over the baseline extent to VNC 22 in a log message according to techniques described above.

Figure 3:
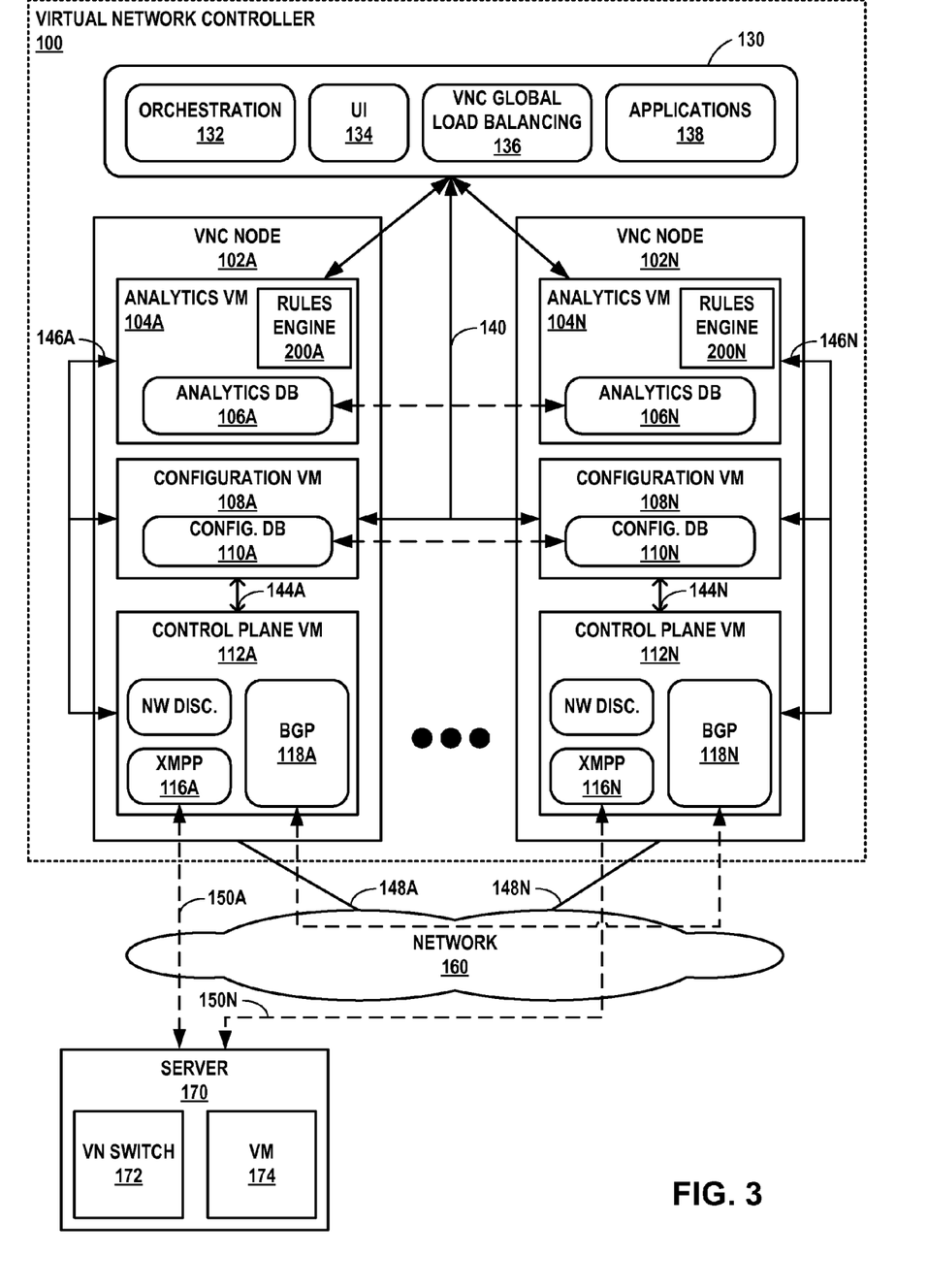
FIG. 3 is a block diagram illustrating an example implementation of a virtual network controller for facilitating operation of one or more virtual networks in accordance with one or more embodiments of this disclosure.

FIG. 3 is a block diagram illustrating an example implementation of a virtual network controller 100 for facilitating operation of one or more virtual networks in accordance with one or more embodiments of this disclosure. Virtual network controller 100 may, for example, correspond to virtual network controller 22 of data center 10 of FIGS. 1 and 2.

As illustrated in the example of FIG. 3, distributed virtual network controller (VNC) 100 includes one or more virtual network controller ("VNC") nodes 102A-102N (collectively, "VNC nodes 102"). VNC nodes 102 that peer with one another according to a peering protocol operating over network 160. Network 160 may represent an example instance of switch fabric 14 and/or IP fabric 20 of FIG. 1. In the illustrated example, VNC nodes 102 peer with one another using a Border Gateway Protocol (BGP) implementation, an example of a peering protocol. VNC nodes 102 provide, to one another using the peering protocol, information related to respective elements of the virtual network managed, at least in part, by the VNC nodes 102. For example, VNC node 102A may manage a first set of one or more servers operating as virtual network switches for the virtual network. VNC node 102A may send information relating to the management or operation of the first set of servers to VNC node 102N by BGP 118A. Other elements managed by VNC nodes 102 may include network controllers and/or appliances, network infrastructure devices (e.g., L2 or L3 switches), communication links, firewalls, and VNC nodes 102, for example. Because VNC nodes 102 have a peer relationship, rather than a master-slave relationship, information may be sufficiently easily shared between the VNC nodes 102. In addition, hardware and/or software of VNC nodes 102 may be sufficiently easily replaced, providing satisfactory resource fungibility.

Each of VNC nodes 102 may include substantially similar components for performing substantially similar functionality, said functionality being described hereinafter primarily with respect to VNC node 102A. VNC node 102A may include an analytics database 106A for storing diagnostic information related to a first set of elements managed by VNC node 102A. VNC node 102A may share at least some diagnostic information related to one or more of the first set of elements managed by VNC node 102A and stored in analytics database 106, as well as to receive at least some diagnostic information related to any of the elements managed by others of VNC nodes 102. Analytics database 106A may represent a distributed hash table (DHT), for instance, or any suitable data structure for storing diagnostic information for network elements in a distributed manner in cooperation with others of VNC nodes 102.

VNC node 102A may include a configuration database 110A for storing configuration information related to a first set of elements managed by VNC node 102A. Control plane components of VNC node 102A may store configuration information to configuration database 110A using interface 144A, which may represent an Interface for Metadata Access Points (IF-MAP) protocol implementation. VNC node 102A may share at least some configuration information related to one or more of the first set of elements managed by VNC node 102A and stored in configuration database 110A, as well as to receive at least some configuration information related to any of the elements managed by others of VNC nodes 102. Configuration database 110A may represent a distributed hash table (DHT), for instance, or any suitable data structure for storing configuration information for network elements in a distributed manner in cooperation with others of VNC nodes 102.

Virtual network controller 100 may perform any one or more of the illustrated virtual network controller operations represented by modules 130, which may include orchestration 132, user interface 134, VNC global load balancing 136, and one or more applications 138. VNC 100 executes orchestration module 132 to facilitate the operation of one or more virtual networks in response to a dynamic demand environment by, e.g., spawning/removing virtual machines in data center servers, adjusting computing capabilities, allocating network storage resources, and modifying a virtual topology connecting virtual switches of a virtual network. VNC global load balancing 136 executed by VNC 100 supports load balancing of analytics, configuration, communication tasks, e.g., among VNC nodes 102. Applications 138 may represent one or more network applications executed by VNC nodes 102 to, e.g., change topology of physical and/or virtual networks, add services, or affect packet forwarding.

User interface 134 includes an interface usable to an administrator (or software agent) to control the operation of VNC nodes 102. For instance, user interface 134 may include methods by which an administrator may modify, e.g. configuration database 110A of VNC node 102A. Administration of the one or more virtual networks operated by VNC 100 may proceed by uniform user interface 134 that provides a single point of administration, which may reduce an administration cost of the one or more virtual networks.

VNC node 102A may include a control plane virtual machine (VM) 112A that executes control plane protocols to facilitate the distributed VNC techniques described herein. Control plane VM 112A may in some instances represent a native process. In the illustrated example, control VM 112A executes BGP 118A to provide information related to the first set of elements managed by VNC node 102A to, e.g., control plane virtual machine 112N of VNC node 102N. Control plane VM 112A may use an open standards based protocol (e.g., BGP based L3VPN) to distribute information about its virtual network(s) with other control plane instances and/or other third party networking equipment(s). Given the peering based model according to one or more aspects described herein, different control plane instances (e.g., different instances of control plane VMs 112A-112N) may execute different software versions. In one or more aspects, e.g., control plane VM 112A may include a type of software of a particular version, and the control plane VM 112N may include a different version of the same type of software. The peering configuration of the control node devices may enable use of different software versions for the control plane VMs 112A-112N. The execution of multiple control plane VMs by respective VNC nodes 102 may prevent the emergence of a single point of failure.

Control plane VM 112A communicates with virtual network switches, e.g., illustrated VM switch 174 executed by server 170, using a communication protocol operating over network 160. Virtual network switches facilitate overlay networks in the one or more virtual networks. In the illustrated example, control plane VM 112A uses Extensible Messaging and Presence Protocol (XMPP) 116A to communicate with at least virtual network switch 172 by XMPP interface 150A. Virtual network route data, statistics collection, logs, and configuration information may in accordance with XMPP 116A be sent as XML documents for communication between control plane VM 112A and the virtual network switches. Control plane VM 112A may in turn route data to other XMPP servers (such as an analytics collector) or may retrieve configuration information on behalf of one or more virtual network switches. Control plane VM 112A may further execute a communication interface 144A for communicating with configuration virtual machine (VM) 108A associated with configuration database 110A. Communication interface 144A may represent an IF-MAP interface.

VNC node 102A may further include configuration VM 108A to store configuration information for the first set of element to and manage configuration database 110A. Configuration VM 108A, although described as a virtual machine, may in some aspects represent a native process executing on an operating system of VNC node 102A. Configuration VM 108A and control plane VM 112A may communicate using IF-MAP by communication interface 144A and using XMPP by communication interface 146A. In some aspects, configuration VM 108A may include a horizontally scalable multi-tenant IF-MAP server and a distributed hash table (DHT)-based IF-MAP database that represents configuration database 110A. In some aspects, configuration VM 108A may include a configuration translator, which may translate a user friendly higher-level virtual network configuration to a standards based protocol configuration (e.g., a BGP L3VPN configuration), which may be stored using configuration database 110A. Communication interface 140 may include an IF-MAP interface for communicating with other network elements. The use of the IF-MAP may make the storage and management of virtual network configurations very flexible and extensible given that the IF-MAP schema can be dynamically updated. Advantageously, aspects of virtual network controller 100 may be flexible for new applications 138.

VNC node 102A may further include an analytics virtual machine (VM) 104A to store diagnostic information (and/or visibility information) related to at least the first set of elements managed by VNC node 102A. Control plane VM and analytics VM 104 may communicate using an XMPP implementation by communication interface 146A. Analytics VM 104A, although described as a virtual machine, may in some aspects represent a native process executing on an operating system of VNC node 102A.

Analytics VM 104A may include analytics database 106A, which may represent an instance of a distributed database that stores visibility information for virtual networks. Visibility information may describe visibility of both distributed VNC 100 itself and of customer networks. The distributed database may include an XMPP interface on a first (southbound) side and a REST/JASON/XMPP interface on a second (northbound) side.

Virtual network switch 172 may implement the layer 3 forwarding and policy enforcement point for one or more end points and/or one or more hosts. The one or more end points or one and/or one or more hosts may be classified into a virtual network due to configuration from control plane VM 112A. Control plane VM 112A may also distribute virtual-to-physical mapping for each end point to all other end points as routes. These routes may give the next hop mapping virtual IP to physical IP and encapsulation technique used (e.g., one of IPinIP, NVGRE, VXLAN, etc.). Virtual network switch 172 may be agnostic to actual tunneling encapsulation used. Virtual network switch 172 may also trap interesting layer 2 (L2) packets, broadcast packets, and/or implement proxy for the packets, e.g. using one of Address Resolution Protocol (ARP), Dynamic Host Configuration Protocol (DHCP), Domain Name Service (DNS), etc.

In some cases, different VNC nodes 102 may be provided by different suppliers. However, the peering configuration of VNC nodes 102 may enable use of different hardware and/or software provided by different suppliers for implementing the VNC nodes 102 of distributed VNC 100. A system operating according to the techniques described above may provide logical view of network topology to end-host irrespective of physical network topology, access type, and/or location. Distributed VNC 100 provides programmatic ways for network operators and/or applications to change topology, to affect packet forwarding, and/or to add services, as well as horizontal scaling of network services, e.g. firewall, without changing the end-host view of the network.

Distributed virtual network controller 100 may perform techniques described herein to dynamically adapt the extent of logging performed by virtual network elements. These techniques may be performed in a distributed manner, which different VNC nodes 102 controlling logging information collection and dynamically modifying the extent of logging information generated by network elements for the VNC node 102 controls, said techniques being described below with respect to VNC 102A.

Analytics VM 104A is configured in configuration database 110 as a collector of logging information generated by the set of network elements controlled, at least in part, by VNC 102A. Analytics VM 104A receives logging information from the network elements and stores the logging information to analytics database 106A for analysis. Logging information stored to analytics database 106A may indicate any of a number of different network element operation dimensions, including resource utilization, types of applications executed, packet transmission/receipt rate, performance, etc., that may indicate to analytics VM 104A and/or a data center administrator of a need to modify the configuration of one or more network elements, increase the number of resources, modify the software for executing applications, and so forth. In the illustrated example, server 170 may send one or more log messages to VNC 102, which control plane VM 112A receives and communicates to analytics VM 104A using XMPP by communication interface 146A. The log messages may include logging information generated and sent according to a baseline extent.

Rules engines 200A-200N of respective analytics VMs 104A-104N apply one or more (i.e., a set of) rules to logging information collected by analytics VM 104A and stored to analytics DB 106A. An administrator may use UI 134 to dynamically configure the rules applied by rules engine 200A to add, modify, or remove rules. Rules engine 200A, for example, may apply the rules or a strict subset of the rules to logging information transported by incoming log messages prior to analytics VM 104A storing the logging information to analytics DB 106A. Alternatively, or additionally, rules engine 200A may apply the rules or a strict subset of the rules continually to logging information stored to analytics DB 106A.

Each of the rules includes actions for a corresponding condition that, when applied and matched by logging information received, cause rules engine 200A to execute the actions. The actions may include directing a network element to modify the extent to which it generates and sends logging information by, e.g., performing "on-demand" information collection responsive to VNC node 102A directives. For example, on-demand information collection may include tracing events in the virtual/physical memory space of an application executing on the network element to obtain logging information and may also, or alternatively, include actively probing the application by directing the application to execute one or more diagnostic subroutines that generate diagnostic logging information.

In general, event tracing may include the recording of information in a particular memory space, whether written to the memory space by the application during normal operation in response to a directive received from VNC 102A (i.e., a collector). The techniques may therefore allow for the production and logging of additional information once an error or any other information message is received. In general, application probing can involve directing the application in question to run integrated diagnostic subroutines to collect additional information that may be useful to analytics VM 104A or an administrator in diagnosing error. Examples of such subroutines include subroutines for setting up/monitoring new counters or events, running various diagnostics, and performing trace routes or other methods to determine a virtual or physical network path through a data center.

Analytics VM 104A may direct an application to modify the extent to which logging information is generated using various techniques, including calling a method of an API exposed by the application in accordance with XMPP interface 150A. In the illustrated example, analytics VM 104 communicates with server 170 via control plane VM 112A using XMPP by communication interface 146A. Calling a method of an exposed API may represent an example instance of logging modification message 43 of FIG. 2.

Server 170 sends additional traced information and/or information retrieved by active probing to VNC 102A for storage in analytics database 106A where it can be retrieved by an administrator or analyzed by analytics VM 104A for troubleshooting purposes. Server 170 may sends logging information in accordance with XMPP interface 150A in this example. However, other communication interfaces for exchanging logging information between VNC 102A and server 170 may be used, including Simple Object Access Protocol (SOAP), Common Object Broker Request Architecture (CORBA), Remote Procedure Calls (RPC), etc.

Figure 4:
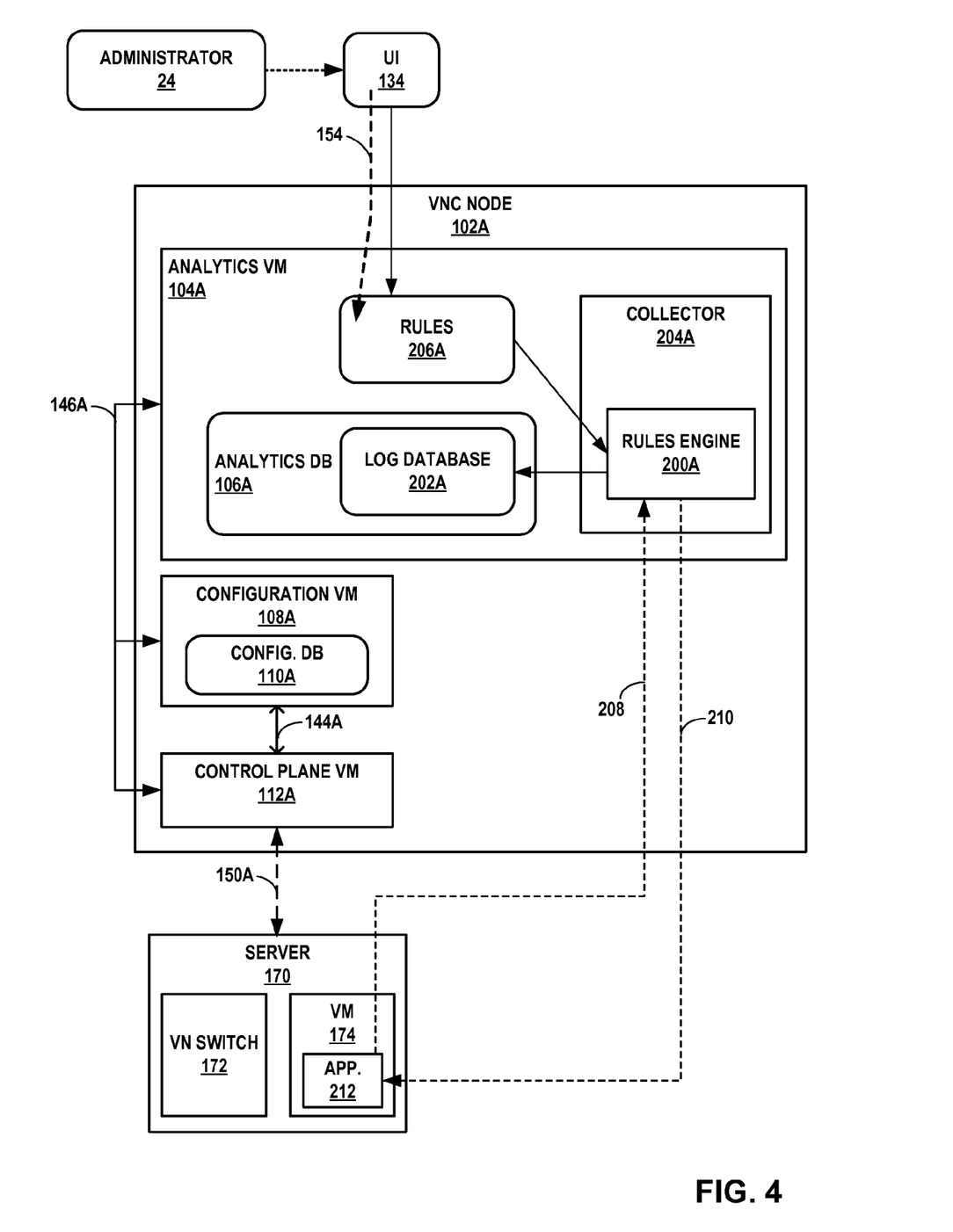
FIG. 4 is a block diagram illustrating, in detail, example components of a virtual network controller to dynamically modify logging information generated by data center elements according to techniques described herein.

FIG. 4 is a block diagram illustrating, in detail, example components of a virtual network controller to dynamically modify logging information generated by data center elements according to techniques described herein. Collector 204A of analytics VM 104A communicates with data center elements to receive logging information in log messages. In the illustrated example, collector 204A receives log message 208 from application 212 executing on virtual machine 174 of server 170. Rules engine 200A applies a set of one or more rules 206A, which each defines conditions and a set of one or more actions, to log messages received and collector 204A stores a representation of the log messages (or at least logging information transported therein) to log database 202A of analytics database 106A. Rules 206A are programmable, in that administrator 24 may interact with UI 134 to add, modify, or delete rules in rules 206A using rule modification message 154. As a result, rules 206A may be extended in the field or post development, and as new rules are defined during system/solution testing or troubleshooting at customer sites. Collector 204A may be implemented in hardware, software, firmware, or any combination thereof.

Although described as a database, log database 202A may be implemented using one or more of a variety of data structures, including various types of databases, log files (i.e., flat files with a series of logged records), tables, linked lists, maps, etc. Logging information in log database 202A may be referenced by entries of a distributed hash table, which allows multiple VNC nodes 102 to identify a location of and obtain logging information for a particular server, for instance.

Logging information transported by log messages, including log message 208, may have a structured format having known field values to enable the application of rules 206A to structured data. For example, log messages may be encoded using XML and may conform to XMPP.

A message may include, e.g., information in the follow general format:

<msg-id, string1, field1, string2, field2, . . . >

The message identifier "msg-id" is a unique message identifier that allows users to identify and select the message in log database 202A. The string fields, "string1, "string2, and so forth can be any character string or bitstring, where particular strings can identify a particular object, error, exception, etc. The fields "field1," "field2," and so forth can contain information relating to properties of the immediately preceding string. Accordingly, a rule of rules 206A:

if (string=_________, field1=_________) then (action)

In the above example of action may define one or actions to be performed by rules engine 204A (or other component of VNC node 102A). For instance, if a particular error occurs (as indicated by string and field1 values) and produces results in a particular location, rules engine 200A may perform an action to determine more information about the error by directing application 212 to generate additional logging information regarding the error. The string and field values can be used in any manner to indicate any form of error, and the actions can be any action that can be undertaken by a computer. The directive to application 212 from rules engine 200A may be to trace the contents of a particular buffer used by an application (i.e. store the contents in the analytics database), retrieve tables or other information, set up an active probe, etc.

Further examples of rules include rules such as:
1. if (Method_1 message-type is X) then (get Method_2 messages using parameters from Method_1 message)
2. if (Method_1 message-type is Y) then (get Method_2 messages using parameters from Method_1 message)
3. if (Method_2 message-type is Z) then (set Method_3 trigger)

In the immediately preceding examples, "Method 1" refers to baseline logging, "Method 2" refers to application tracing, and "Method 3" refers to active probing (e.g., triggering diagnostic subroutines in an application). In other words, examples Rules 1 and 2 trigger application tracing if either of two different message-types ("X" and "Y", which may be indicated by particular string/field combinations, for instance) occurs, and Rule 3 triggers a particular probe if another message-type ("Z") occurs. In the illustrated example, one of rules 206A matches logging information received in log message 208, and rules engine 200A performs the corresponding action for the rule to send logging modification message 210 to application 212 to modify the extent of logging information generated. In some instances, a rule may cause logging information received in "Method 2" messages to trigger a "Method 3" action, and vice-versa. As noted above, the techniques may include other types of rules other types of "methods" that direct the generation of logging information in other ways.

Other types of actions that may be defined by rules 206A is the implementation and population of secondary tables containing certain information. For example, rules 206A when applied by rules engine 200A can direct applications to generate and store specific additional information required by certain troubleshooting applications to the secondary tables, which may store information in any format.

Figure 5:
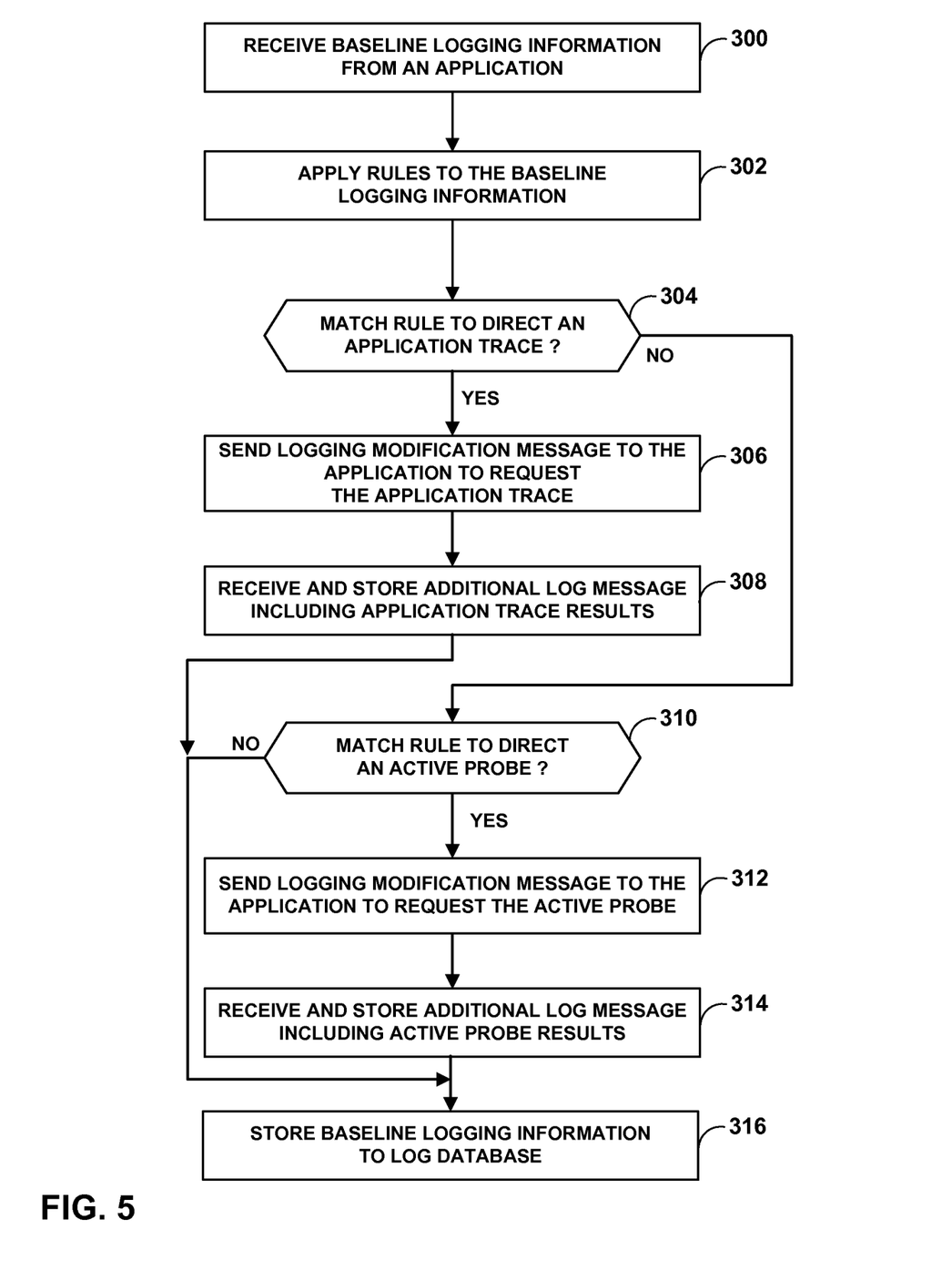
FIG. 5 is a flowchart illustrating an example mode of operation of a virtual network controller to dynamically modify logging information generated by a data center element or other generator according to techniques described herein.

FIG. 5 is a flowchart illustrating an example mode of operation of a virtual network controller to dynamically modify logging information generated by a data center element or other generator according to techniques described herein. The example is described for illustrative purposes with respect to components of VNC node 102A of FIG. 4. Initially, collector 204A receives baseline logging information in a log message 208 from application 212 in accordance with a baseline extent for application 212 (300). Rules engine 200A applies rules 206A or a strict subset thereof to the baseline logging information to attempt to match respective rule conditions to properties of the baseline logging information (302). If one of rules 206A applied by rules engine 200A matches and specifies an application tracing action (YES branch of 304), rules engine 200A sends logging modification message 210 to include a directive to application 212 to perform an application trace (306). Subsequently, collector 204A receives a responsive log message that includes the application trace results for analysis by, e.g. analytics VM 104A (308). Collector 204A stores the logging information to log database 202A.

If one of rules 206A applied by rules engine 200A matches and specifies an active probe action (YES branch of 310), rules engine 200A sends logging modification message 210 to include a directive to application 212 to perform an active probe (312). Subsequently, collector 204A receives a responsive log message that includes the active probe results for analysis by, e.g. analytics VM 104A (314). Collector 204A stores the logging information to log database 202A (316). If none of the rules 206A applied by rules engine 200A to log message 208 match (NO branch of 310), collector 204A only stores the logging information to log database 202A (316). In some cases logging information may match multiple rules 206A and cause rules engine 200A to execute multiple corresponding sets of actions of different types (e.g., both application tracing and active probing).

Figure 6:
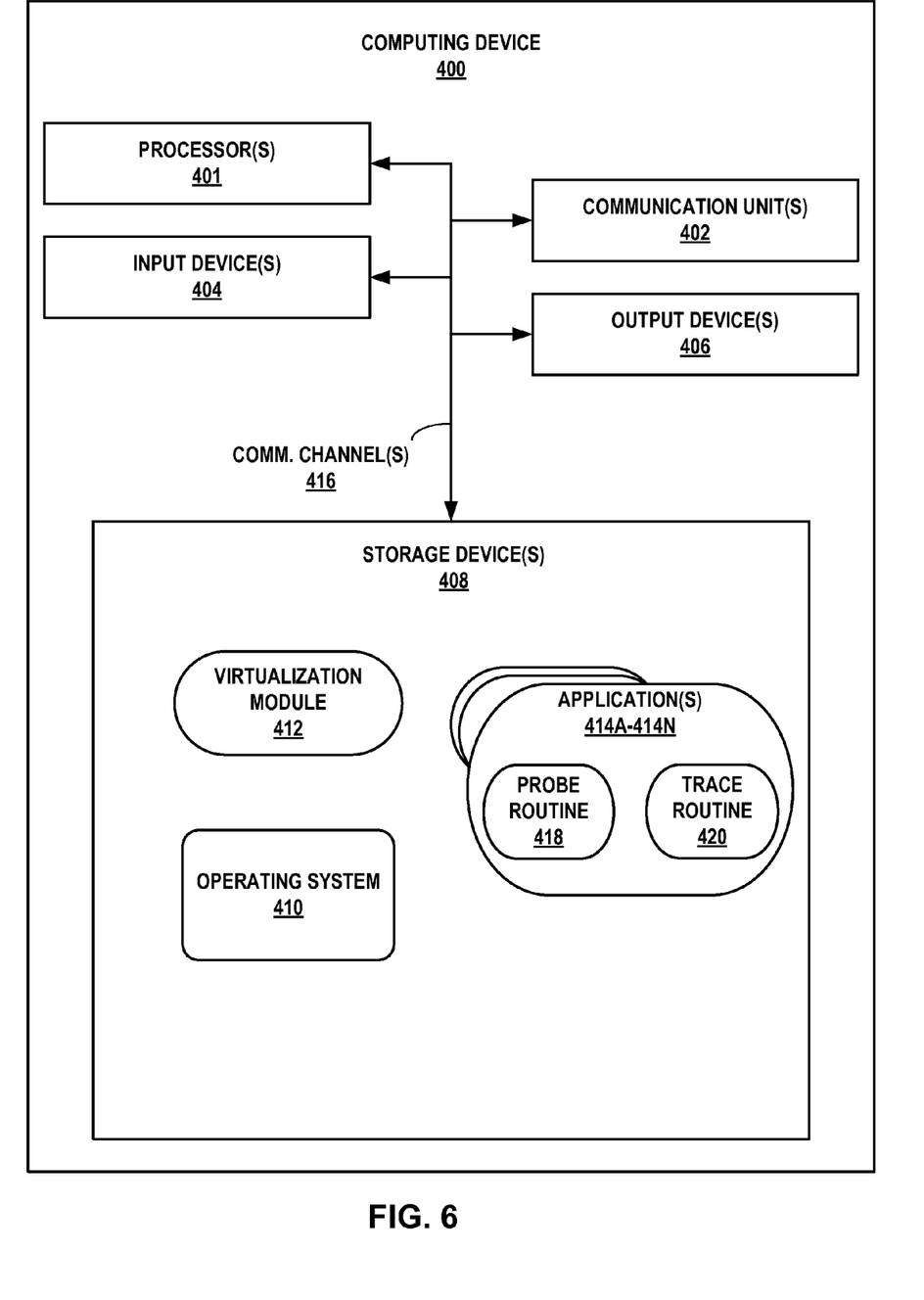
FIG. 6 is a block diagram illustrating an example computing device configured to dynamically modify an extent of logging in response to directives from a collector, according to techniques described in this disclosure.

FIG. 6 is a block diagram illustrating an example computing device configured to dynamically modify an extent of logging in response to directives from a collector, according to techniques described in this disclosure. Computing device 400 may represent, e.g., any of servers 12, TORs 16, or chassis switches 18 of FIG. 1. FIG. 6 illustrates only one particular example of computing device 400, and many other examples of computing device 400 may be used in other instances. For example, a computing device that implements TORs 16 and chassis switches 18 may include a high-speed distributed forwarding plane.

As shown in the specific example of FIG. 6, computing device 400 includes one or more processors 401, one or more communication units 402, one or more input devices 404, one or more output devices 406, and one or more storage devices 408. Computing device 400 further includes operating system 410, virtualization module 412, and one or more applications 414A-414N (collectively "applications 414"). Virtualization module 412 may represent hypervisor 31 of server 12A, for instance, and applications 414 may represent different VMs 36. Each of components 401, 402, 404, 406, and 408 may be interconnected (physically, communicatively, and/or operatively) for inter-component communications. As one example in FIG. 6, components 401, 402, 404, 406, and 408 may be coupled by one or more communication channels 416. In some examples, communication channels 416 may include a system bus, network connection, interprocess communication data structure, or any other channel for communicating data. Virtualization module 412 and applications 414, as well as operating system 410 may also communicate information with one another as well as with other components in computing device 400. Virtualization module 412 includes software switch 420 to switch packets on one or more virtual networks. Virtualization module 412 also includes flow trace module 418 to determine physical network paths of network flows switched by computing device 400 by generating flow trace packets and incrementally setting respective TTL values to cause downstream switching device to return time exceeded messages to computing device. Flow trace module 418 may represent an example instance of FTM 48 of FIG. 1.

Processors 401, in one example, are configured to implement functionality and/or process instructions for execution within computing device 400. For example, processors 401 may be capable of processing instructions stored in storage devices 408. Examples of processors 401 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 408 may be configured to store information within computing device 400 during operation. Storage devices 408, in some examples, are described as a computer-readable storage medium. In some examples, storage devices 408 are a temporary memory, meaning that a primary purpose of storage devices 408 is not long-term storage. Storage devices 408, in some examples, are described as a volatile memory, meaning that storage devices 408 do not maintain stored contents when the computer is turned off. Examples of volatile memories include random access memories (RAM), dynamic random access memories (DRAM), static random access memories (SRAM), and other forms of volatile memories known in the art. In some examples, storage devices 408 are used to store program instructions for execution by processors 401. Storage devices 408, in one example, are used by software or applications running on computing device 400 (e.g., operating system 410, virtualization module 412 and the like) to temporarily store information during program execution.

Storage devices 408, in some examples, also include one or more computer-readable storage media. Storage devices 408 may be configured to store larger amounts of information than volatile memory. Storage devices 408 may further be configured for long-term storage of information. In some examples, storage devices 408 include non-volatile storage elements. Examples of such non-volatile storage elements include magnetic hard discs, tape cartridges or cassettes, optical discs, floppy discs, flash memories, or forms of electrically programmable memories (EPROM) or electrically erasable and programmable memories (EEPROM).

Computing device 400, in some examples, also includes one or more communication units 402. Computing device 400, in one example, utilizes communication units 402 to communicate with external devices. Communication units 402 may communicate, in some examples, by sending data packets over one or more networks, such as one or more wireless networks, via inbound and outbound links. Communication units 402 may include one or more network interface cards (IFCs), such as an Ethernet card, an optical transceiver, a radio frequency transceiver, or any other type of device that can send and receive information. Other examples of such network interfaces may include Bluetooth, 3G and Wi-Fi radio components. In some examples, computing device 400 utilizes communication units 402 to exchange tunneled packets with other computing devices in a virtualized network domain of a data center.

Computing device 400, in one example, also includes one or more input devices 404. Input devices 404, in some examples, are configured to receive input from a user through tactile, audio, or video feedback. Examples of input devices 404 include a presence-sensitive display, a mouse, a keyboard, a voice responsive system, video camera, microphone or any other type of device for detecting a command from a user. In some examples, a presence-sensitive display includes a touch-sensitive screen.

One or more output devices 406 may also be included in computing device 400. Output devices 406, in some examples, are configured to provide output to a user using tactile, audio, or video stimuli. Output devices 406, in one example, include a presence-sensitive display, a sound card, a video graphics adapter card, or any other type of device for converting a signal into an appropriate form understandable to humans or machines. Additional examples of output devices 406 include a speaker, a cathode ray tube (CRT) monitor, a liquid crystal display (LCD), or any other type of device that can generate intelligible output to a user.

Computing device 400 may include operating system 412. Operating system 412, in some examples, controls the operation of components of computing device 400. For example, operating system 412, in one example, facilitates the communication of modules applications 414 with processors 401, communication units 402, input devices 404, output devices 406, and storage devices 410. Applications 414 may each include program instructions and/or data that are executable by computing device 400.

As one example, application 414A may include instructions that cause computing device 400 to perform one or more of the operations and actions described in the present disclosure. Application 414A includes probe routine 418 and trace routine 420. Responsive to directives from a collector, probe routine 418 increases an extent to which application 414A generates logging information. Responsive to directives from a collector, trace routine 420 reads application trace information from memory to generate additional logging information. Application 414A sends generated logging information to the collector.

Figure 7:
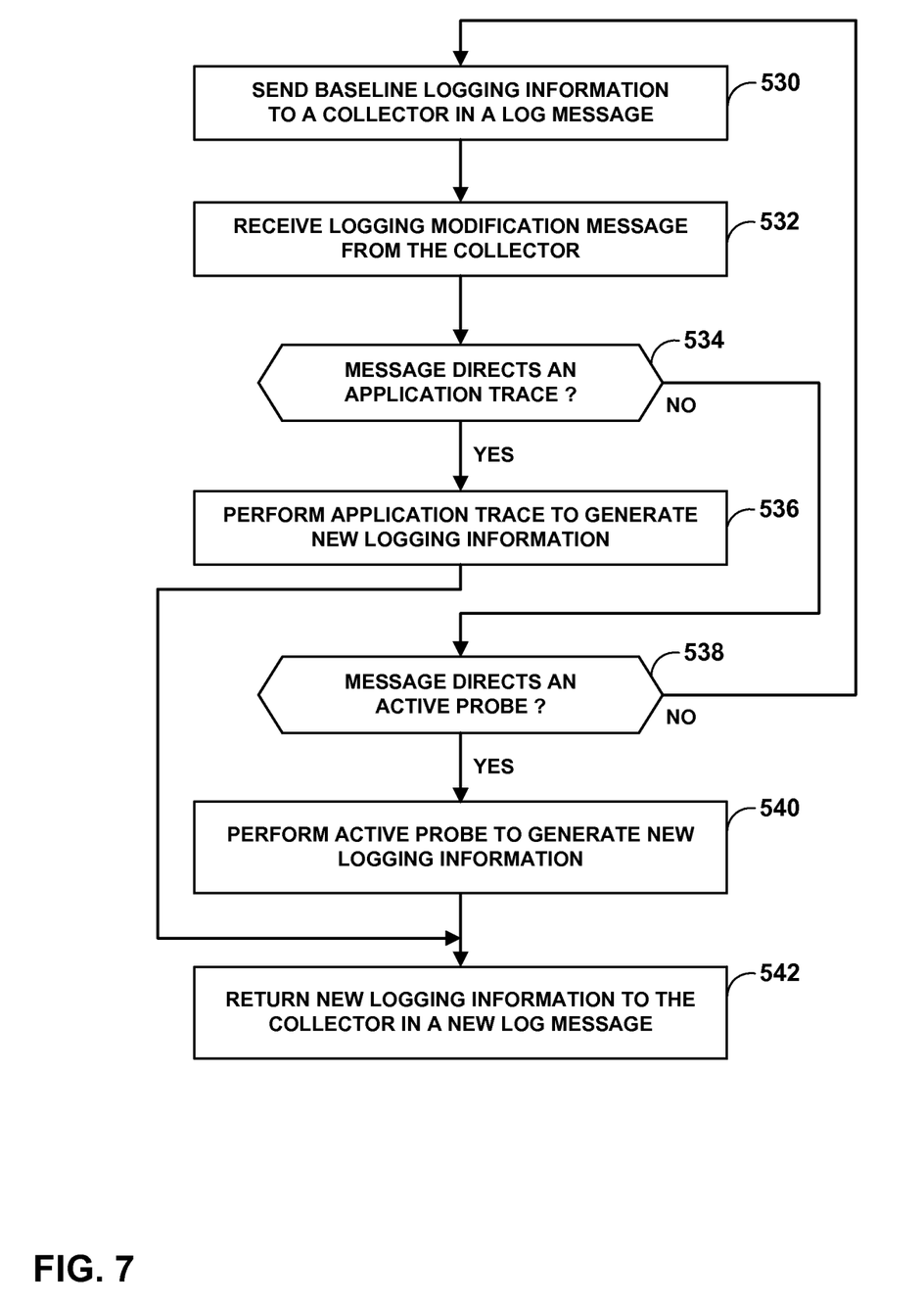
FIG. 7 is a flowchart illustrating an example mode of operation by an application to dynamically modify an extent of logging in response to directives from a collector, according to techniques described in this disclosure.

FIG. 7 is a flowchart illustrating an example mode of operation by an application to dynamically modify an extent of logging in response to directives from a collector, according to techniques described in this disclosure. The example mode of operation is described for illustrative purposes with respect to computing device 400 of FIG. 6.

Initially, application 414A of computing device 400 is configured to send baseline logging information to a collector, such as VNC 22 of FIG. 1, in a log message (530). Application 414A receives a logging modification message from the collector directing application 414A to modify the extent of logging information generation (532). If the logging modification message includes a directive to perform an application trace (YES branch of 534), trace routine 420 executes to perform the application trace and generate new logging information in accordance with zero or more parameters specified in the logging modification message (536). For example, the logging modification message may specify performing the application trace with respect to a particular data structure stored by application 414A.

If the logging modification message includes a directive to perform an active probe (YES branch of 538), probe routine 418 executes to perform the probe to generate new logging information (540). Performing the probe may include setting a flag or modifying a variable to increase an extent to which application 414A generates logging information. Application 414A sends the newly-generated logging information in a new log message to the collector for analysis (542).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
sending, by a control plane virtual machine of a virtual network controller using an eXtensible Messaging and Presence Protocol (XMPP) and to a virtual network switch of a server device of a set of server devices that implement a virtual network, configuration information to configure the virtual network switch to forward, for a virtual machine of the server device that executes an application, network traffic over the virtual network by tunneling packets to one or more additional server devices having corresponding virtual network switches to facilitate overlay by the virtual network of a physical network interconnecting the set of server devices,
wherein the virtual network controller comprises:
a configuration virtual machine to store and manage at least a portion of a configuration database that stores a set of configuration information for the virtual network switches;
an analytics virtual machine to store and manage at least a portion of an analytics database that stores a set of logging information for the virtual network switches;
receiving, by a collector executing by the analytics virtual machine and via the control plane virtual machine, a log message that includes logging information from a generator of the server device;
applying, by a rules engine of the collector, one or more rules that each specifies a condition and a corresponding action to the logging information of the log message to identify a matching rule; and
upon identifying the matching rule, executing the action of the matching rule to generate and send a logging modification message to increase an extent to which the generator generates subsequent logging information, wherein the action of the matching rule specifies at least one of an active probe to trigger a diagnostic subroutine of the application and an application trace to trace contents of a memory buffer used by the application, and wherein the logging modification message includes a directive to the generator to perform the at least one of the active probe of the application and the application trace of the application;
configuring, by the control plane virtual machine, the virtual network switches using XMPP to send route data and the set of configuration information to the virtual network switches; and
receiving, by the control plane virtual machine using XMPP, the log message and routing the log message to the analytics virtual machine for storage of the logging information of the log message to the analytics database.

2. The method of claim 1, further comprising:
receiving, by the collector, an additional log message that includes additional logging information generated by the generator in accordance with the increased extent.

3. The method of claim 2, wherein the action of the matching rule specifies the active probe of the application, and wherein the additional logging information comprises a result of the active probe.

4. The method of claim 2, wherein the action of the matching rule specifies the application trace of the application, and wherein the additional logging information comprises a result of the application trace.

5. The method of claim 1, further comprising:
receiving, by the collector, a rule modification message that includes a new rule;
adding the new rule to the one or more rules; and
applying the new rule to the logging information.

6. A network device comprising:
at least one memory;
one or more processors operably coupled to the at least one memory;
a virtual network controller configured for execution by the one or more processors and comprising:
a control plane virtual machine to send, using an eXtensible Messaging and Presence Protocol (XMPP) and to a virtual network switch of a server device of a set of server devices that implement a virtual network, configuration information to configure the virtual network switch to forward, for a virtual machine of the server device that executes an application, network traffic over the virtual network by tunneling packets to one or more additional server devices having corresponding virtual network switches to facilitate overlay by the virtual network of a physical network interconnecting the set of server devices;
a configuration virtual machine to store and manage at least a portion of a configuration database that stores a set of configuration information for the virtual network switches;
an analytics virtual machine to store and manage at least a portion of an analytics database that stores a set of logging information for the virtual network switches,
wherein the analytics virtual machine is configured to execute a collector to receive, via the control plane virtual machine, a log message that includes logging information from a generator of the server device,
wherein the analytics virtual machine is further configured to execute a rules engine to apply one or more rules that each specifies a condition and a corresponding action to the logging information of the log message to identify a matching rule,
wherein the rules engine, upon identifying the matching rule, executes the action of the matching rule to generate and send a logging modification message to increase an extent to which the generator generates subsequent logging information, wherein the action of the matching rule specifies at least one of an active probe to trigger a diagnostic subroutine of the application and an application trace to trace contents of a memory buffer used by the application, and wherein the logging modification message includes a directive to the generator to perform the at least one of the active probe of the application and the application trace of the application, and wherein the control plane virtual machine configures the virtual network switches by using XMPP to send route data and the set of configuration information to the virtual network switches, and
wherein the control plane virtual machine uses XMPP to receive the log message for the virtual network switch and routing the log message to the analytics virtual machine for storage of the logging information of the log message to the analytics database.

7. The network device of claim 6, wherein the collector receives an additional log message that includes additional logging information generated by the generator in accordance with the increased extent.

8. The network device of claim 7, wherein the action of the matching rule specifies the active probe of the application, and wherein the additional logging information comprises a result of the active probe.

9. The network device of claim 7, wherein the action of the matching rule specifies the application trace of the application, and wherein the additional logging information comprises a result of the application trace.

10. The network device of claim 6,
wherein the control plane virtual machine is configured to receive a rule modification message that includes a new rule and add the new rule to the one or more rules,
wherein the rules engine applies the new rule to the logging information.

11. The network device of claim 6,
wherein the analytics database includes a log database,
wherein the collector stores the logging information to the log database.

12. The network device of claim 11,
wherein the analytics virtual machine is configured to analyze the analytics database to diagnose conditions of the virtual network.

13. A system comprising:
a virtual network controller comprising:
at least one memory;
first one or more processors operably coupled to the at least one memory;
a control plane virtual machine configured for execution by the first one or more processors to send, using an eXtensible Messaging and Presence Protocol (XMPP) and to a virtual network switch of a server device of a set of server devices that implement a virtual network, configuration information to configure the virtual network switch to forward, for a virtual machine of the server device that executes an application, network traffic over the virtual network by tunneling packets to one or more additional server devices having corresponding virtual network switches to facilitate overlay by the virtual network of a physical network interconnecting the set of server devices;
a configuration virtual machine configured for execution by the first one or more processors to store and manage at least a portion of a configuration database that stores a set of configuration information for the virtual network switches;
an analytics virtual machine configured for execution by the first one or more processors to store and manage at least a portion of an analytics database that stores a set of logging information for the virtual network switches,
wherein the analytics virtual machine is configured to execute a collector to receive, via the control plane virtual machine, a log message that includes logging information from a generator of the server device, wherein the analytics virtual machine is further configured to execute a rules engine to apply one or more rules that each specifies a condition and a corresponding action to the logging information of the log message to identify a matching rule, wherein the rules engine, upon identifying the matching rule, executes the action of the matching rule to generate and send a logging modification message to increase an extent to which the generator generates subsequent logging information, wherein the action of the matching rule specifies at least one of an active probe to trigger a diagnostic subroutine of the application and an application trace to trace contents of a memory buffer used by the application, and wherein the logging modification message includes a directive to the generator to perform the at least one of the active probe of the application and the application trace of the application, and wherein the control plane virtual machine configures the virtual network switches by using XMPP to send route data and the set of configuration information to the virtual network switches, and wherein the control plane virtual machine uses XMPP to receive the log message for the virtual network switch and routing the log message to the analytics virtual machine for storage of the logging information of the log message to the analytics database; and the server device, wherein the server device comprises:

a memory;

second one or more processors operably coupled to the memory;

a virtual machine configured for execution by the second one or more processors;

the generator, wherein the generator is configured for execution by the virtual machine;

an output device to send, to the collector of the virtual network controller, the baseline logging information for the application in the log message; and an input device to receive, from the collector of the virtual network controller, the logging modification message, wherein the generator, responsive to the logging modification message, increases the extent to which the generator generates subsequent logging information, and wherein the output device sends, to the collector, an additional log message that includes additional logging information generated by the generator in accordance with the increased extent.

14. The system of claim 13, wherein the server device further comprises an active probe module of the generator to execute the active probe, wherein the additional logging information comprises a result of the application probe.

15. The system of claim 13, wherein the server device further comprises an application trace module to execute the application trace, wherein the additional logging information comprises a result of the application trace.

16. A non-transitory computer-readable storage medium comprising instructions for causing one or more programmable processors to:

send, by a control plane virtual machine of a virtual network controller using an eXtensible Messaging and Presence Protocol (XMPP) and to a virtual network switch of a server device of a set of server devices that implement a virtual network, configuration information to configure the virtual network switch to forward, for a virtual machine of the server device that executes an application, network traffic over the virtual network by tunneling packets to one or more additional server devices having corresponding virtual network switches to facilitate overlay by the virtual network of a physical network interconnecting the set of server devices, wherein the virtual network controller comprises:

a configuration virtual machine to store and manage at least a portion of a configuration database that stores a set of configuration information for the virtual network switches;

an analytics virtual machine to store and manage at least a portion of an analytics database that stores a set of logging information for the virtual network switches;

receive, by a collector executing by the analytics virtual machine and via the control plane virtual machine, a log message that includes logging information from a generator of the server device;

apply, by a rules engine of the collector, one or more rules that each specifies a condition and a corresponding action to the logging information of the log message to identify a matching rule; and upon identifying the matching rule, execute the action of the matching rule to generate and send a logging modification message to increase an extent to which the generator generates subsequent logging information, wherein the action of the matching rule specifies at least one of an active probe to trigger a diagnostic subroutine of the application and an application trace to trace contents of a memory buffer used by the application, and wherein the logging modification message includes a directive to the generator to perform the at least one of the active probe of the application and the application trace of the application;

configure, by the control plane virtual machine, the virtual network switches using XMPP to send route data and the set of configuration information to the virtual network switches; and receive, by the control plane virtual machine using XMPP, the log message and routing the log message to the analytics virtual machine for storage of the logging information of the log message to the analytics database.

17. The non-transitory computer-readable storage medium of claim 16, wherein the instructions further cause the one or more programmable processors to:

receive, by the collector, an additional log message that includes additional logging information generated by the generator in accordance with the increased extent.

18. The non-transitory computer-readable storage medium of claim 17, wherein the action of the matching rule specifies the active probe of the application, and wherein the additional logging information comprises a result of the active probe.

* * * * *